Feb. 3, 1931.                E. C. POST                1,791,284
                            HOSE COUPLING
                          Filed June 24, 1926
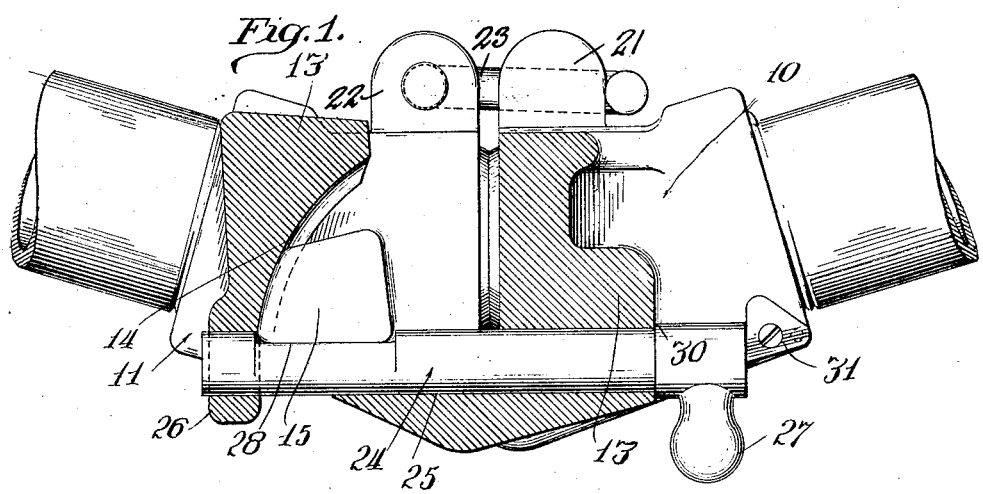
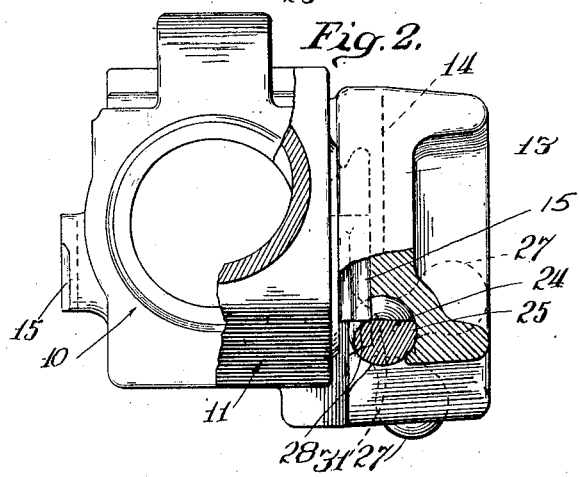
Inventor
Edward C. Post.
By Barnett & Truman
Attorneys Patented Feb. 3, 1931

1,791,284

UNITED STATES PATENT OFFICE

EDWARD C. POST, OF CHICAGO, ILLINOIS, ASSIGNOR TO VAPOR CAR HEATING COMPANY, INC., OF CHICAGO, ILLINOIS, A CORPORATION OF ILLINOIS

HOSE COUPLING

Application filed June 24, 1926. Serial No. 118,238.

This invention relates to train pipe hose couplings and particularly to couplings of the gravity type in which mating coupler heads are rocked into interlocking engagement with each other, and are held in their locking position by the action of gravity.

The object of the invention is to provide, in couplers of the above general type, improved positive locking means which are so positioned on one coupler head as to engage the lower edge of the locking cam lug of a mating coupler; which will be convenient for the trainmen to operate; and which may be made relatively heavy without interfering with the coupling operations of mating coupler heads.

The invention consists in certain novel and improved constructions and combinations of parts to be hereinafter described and claimed for carrying out the above stated objects and such other objects as will appear from the detailed description of the embodiments of the invention shown in the accompanying drawings.

In the drawings:

Fig. 1 is a longitudinal vertical section through two interlocking coupler heads, one of which is provided with a positive lock made in accordance with my invention.

Fig. 2 is an end view partially broken away of the improved coupler head shown in Fig. 1.

The coupling shown consists of a coupler head 10 made in accordance with the present invention and interlocked with a coupler head 11 of the ordinary gravity type. Each of the coupler heads shown in the above figures of the drawings consists of a body portion 12 provided at one side with a longitudinally extending arm 13 which overlaps the body portion of the other coupler head. The end of the arm 13 is formed with a curved undercut cam 14 which interlocks with a curved cam lug 15 formed on the side of the other coupler head. The mating couplers 10 and 11 are brought into interlocking engagement with each other by rocking them about a common transverse axis to move the ends of the cam arms 13 downward into interlocking engagement with the grooved cam lugs 15 of the mating coupler heads, as shown in Figs. 1 and 2. The radius and position of the cams 14, 15 are substantially uniform in all couplers of the above general type, so that they will interlock one with another.

In order to prevent accidental disengagement of the coupler heads, the improved coupler head 10 is provided with a locking bar 24 which is rotated into and out of engagement with the cam lug 15.

The locking bar is round in cross section and extends through a bore 25 in the cam arm 13 of the coupler head. The end of the cam arm is formed with a bearing 26 for the outer end of the locking bar. The other end of the bar is formed with a weighted arm 27 which swings outwardly and downwardly to move the bar to its locking position. The portion of the locking bar which extends under the cam lug 15 of the mating coupler is cut away to provide a cam surface or eccentric portion 28 which, as indicated in Fig. 2, engages the lower edge of the cam lug 15 when the coupler heads are locked together. When the weighted arm 27 is in the position shown in dotted lines in Fig. 2, the portion 28 of the locking bar assumes the dotted line position shown in Fig. 2 and permits the bar to pass the cam lug 15 when the coupler heads are being rocked to their interlocking position. The arm 27 may then be swung downward to the position indicated in full lines in Fig. 6 so as to bring the cam surface of the bar into engagement with the lower edge of the cam lug 15 of the mating coupler. When the bar 24 is rotated to its locking position, the lower edge of the cam lug 15 bears against the cam surface of the bar at a point near the vertical center of the bar so as to minimize any tendency that the downward pressure of the cam lug may have to swing the weighted arm 27 upward to its unlocking position. The weighted end of the arm holds the locking bar in its locking position. By arranging the bar so that the cam surface is rotated into locking position beneath the cam lug, a firm positive lock may be had regardless of any variations in the position of the lower edge of the cam lug with relation to the longitudinal center of the locking bar.

The locking bar is held against longitudinal movement by means of a shoulder 30 formed at one end of the bar and a retaining member 31 which bears against the end of the bar.

The position of the locking bar near the lower part of the cam arm 13 makes it possible to so reinforce the said cam arm as to permit the use of a locking bar of relatively large cross-section, without interfering with the movement of the coupler head during the preliminary interlocking engagement of the couplers.

The top face of the coupler head 10 is provided with a lug 21, corresponding in contour to the lug 22 of the coupler head 11, so that the pivoted link 23, which is standard in couplers of this general character can be driven over the lug 21 to the position indicated in Figs. 1 and 2.

In the drawings only one of the interlocking coupler heads is provided with the locking bar of the present invention. It will be obvious, however, from an inspection of the drawings, that the improved coupler head 10 will interlock with another coupler of the same construction or with the standard coupler head of the gravity type.

I claim:

1. A hose coupler head formed on one side with a cam lug and on the other side with an arm formed with an under-cut cam adapted to interlock with a cam lug of a mating coupler, and means for positively locking the coupler head in its interlocking engagement with said mating coupler comprising a locking bar formed with a recess to provide clearance for permitting the mating coupler to be interlocked and to form a cam surface adapted to be rotated into engagement with the cam lug of said mating coupler.

2. A hose coupler head formed on one side with a cam lug and on the other side with an arm formed with an under-cut cam adapted to interlock with a cam lug of a mating coupler, and means for positively locking the coupler head in its interlocking engagement with said mating coupler comprising a locking bar rotatably supported in a bore extending longitudinally of the arm of said coupler head, and formed intermediate its ends with a cam surface which, when the bar is in one position, permits the coengaging couplers to be interlocked with each other and which, in another position, swings into engagement with the lower edge of the cam to lock the couplers in their operative position.

3. A hose coupler head formed on one side with a lug having a cam groove and on the other side with a forwardly projecting arm formed with an undercut cam adapted to interlock with the corresponding cam lug on a mating coupler, and means for positively locking the coupler head in its interlocking engagement with said mating coupler comprising a cylindrical bar supported for rocking movement in a bore formed longitudinally in the head and arm in substantially vertical alignment with the interlocked cams, a portion of the cylindrical bar intermediate its ends being cut away to form an eccentric portion which, in one position of the bar will permit the cam lug to pass through the cut away portion, but in another rotary position of the bar will be moved beneath the lug to lock the couplers in interlocked engagement.

4. A hose coupler formed on one side with a lug having a cam groove and on the other side with a forwardly projecting arm formed with an undercut cam adapted to interlock with the corresponding cam lug on a mating coupler, and means for positively locking the coupler head in its interlocking engagement with said mating coupler comprising a cylindrical bar supported for rocking movement in a bore formed longitudinally in the head and arm in substantially vertical alignment with the interlocked cams, a portion of the cylindrical bar intermediate its ends being cut away to form an eccentric portion which, in one position of the bar will permit the cam lug to pass through the cut away portion, but in another rotary position of the bar will be moved beneath the lug to lock the couplers in interlocked engagement, and a weighted arm projecting laterally from the bar for normally rocking the bar to locking position.

5. A hose coupler formed on one side with a cam lug and on the other side with an arm formed with an under-cut cam adapted to interlock with a cam lug of a mating coupler, and means for positively locking the coupler head in its interlocking engagement with the mating coupler comprising a locking bar supported within a bore formed longitudinally of the arm of the coupler head, there being bearings formed in the end portions of the bore adjacent the respective ends of the arm in which the respective end portions of the bar are rotatably journaled, the bar being formed intermediate said journaled portions with a cam surface adapted to be rotated into engagement with the lower portion of the lug on the other coupler head.

EDWARD C. POST.